Aug. 24, 1943.                    W. J. WEBERG                       2,327,685
                              CUSHIONING TOOL HOLDER
                              Filed July 25, 1941
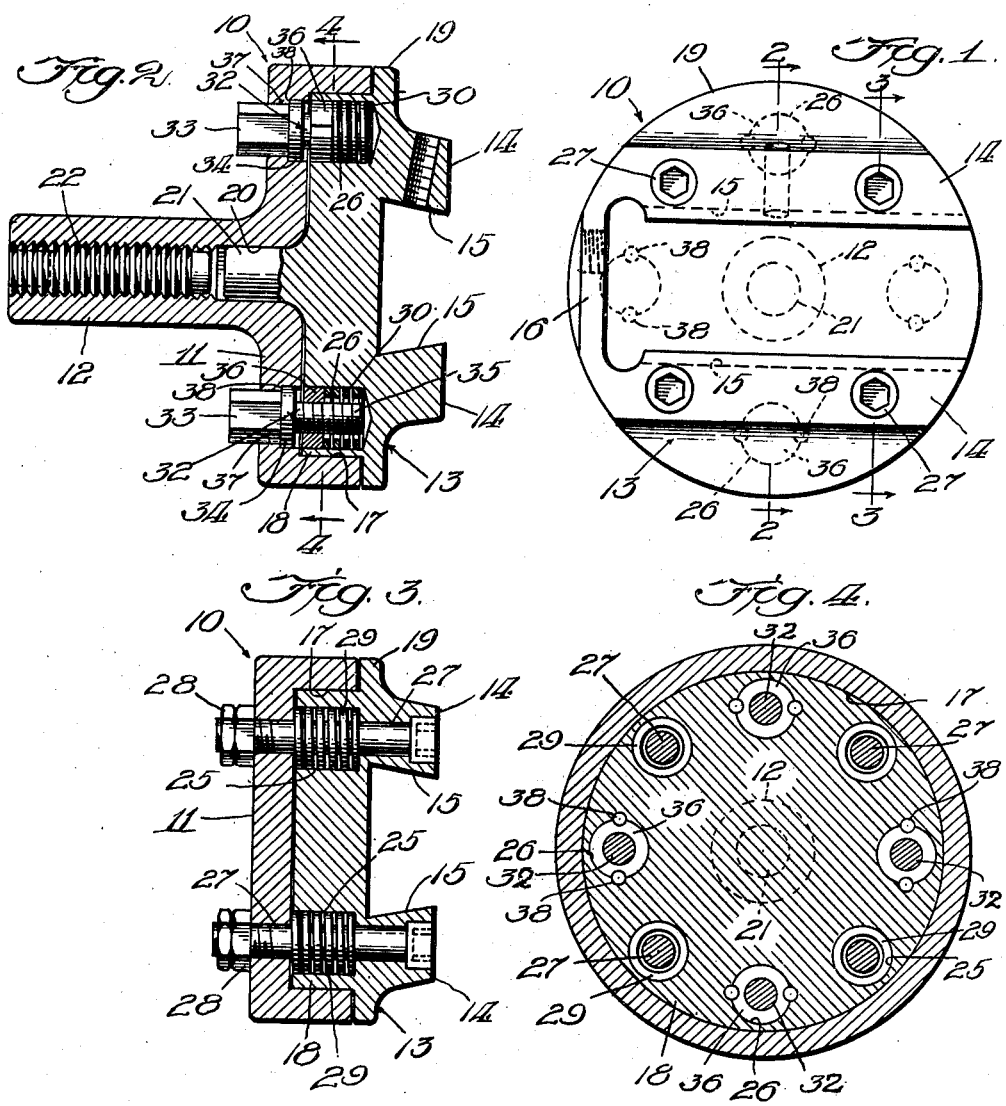
Inventor:
William J. Weberg
By Offield Nehlhope Scott & Houle
Atty.s Patented Aug. 24, 1943

2,327,685

UNITED STATES PATENT OFFICE 2,327,685

CUSHIONING TOOL HOLDER

William J. Weberg, Chicago, Ill.

Application July 25, 1941, Serial No. 403,953

8 Claims. (Cl. 29—103)

This invention relates to improvements in rotary holders for flying cutting tools of the type wherein a tool or bit is secured eccentrically of the face of the holder so as to produce a circular cut in the work.

The principal object of the invention is to provide a spring cushioning connection between parts of the tool holder body so as to permit limited yielding or cushioning movement of the tool relative to its driving spindle. A further object of the invention is to provide a simple and facile means for adjusting the effective tension of the cushioning springs, and also to provide means at will to limit or dispense with the cushioning effect when desired.

The invention may best be understood by reference to the accompanying drawing, in which Figure 1 is a bottom view of a tool holder body of my invention, but with the laterally adjustable tool-holding block removed therefrom to show the novel features of the cushioning device more clearly.

Figure 2 is a section taken on line 2—2 of Figure 1, and indicating to an exaggerated degree the amount of limited relative movement between the upper and lower parts of the tool holder.

Figure 3 is a section taken on line 3—3 of Figure 1.

Figure 4 is a section taken on line 4—4 of Figure 2.

In the embodiment of my invention illustrated in the drawing, the tool holder body is indicated generally at 10, and includes a top plate or driving member 11 which has a cylindrical shank 12 for suitable connection with the driving spindle of a lathe, boring machine or the like, and a separable bottom plate or tool support 13 which has means as usual for mounting a tool-holding block (not shown) for adjustment transversely thereof at varying distances from the axis of rotation of the tool body. In the form shown herein, the bottom plate has a pair of ribs 14, 14 formed across its bottom face, having undercut inner faces 15, 15 to form a slot for receiving the tool holder block for adjustment toward and away from a closed end wall 16. The tool holding block and its lateral adjusting means are not shown herein because they form no part of the present invention.

The top plate 11 has an annular recess 17 in its bottom face for receiving an annular upstanding portion 18 of the bottom plate 13, preferably with a close, or lapping fit. The outer peripheries of the top plate 11 and the flanged base 19 of said bottom plate are flush with each other.

The shank 12 of the top plate also has a bore 20 therethrough which receives a centrally disposed hub portion 21 of the bottom plate. The outer end of the bore 20 is threaded to receive a screw 22 adjustable from the upper end of the shank 12, as shown in Figure 2. The purpose of screw 22 will presently be described.

A plurality of bored recesses 25 and 26 are formed adjacent the periphery of the upstanding portion 18 of the bottom plate, which holes open upwardly toward the top plate 11 and on axes parallel with the turning axis of the tool holder body. In the form shown, four recesses 25 and an equal number of recesses 26 are shown, disposed alternately on the same diameters, but it will be understood that the number and relationship of these recesses may be varied, if desired. As shown in Figure 3, the recesses 25 each have concentric bolts 27 extending through the ribs 14 and the bottom flange 18 and passing upwardly through the top plate 11. Said bolts have lock nuts 28, 28 threaded on their upper ends. A coil spring 29 is also mounted in each of the recesses 25, surrounding its respective bolt 27, and maintained under compression to tend to urge the top and bottom plates away from each other. The amount of yielding separation between said plates is limited and determined by adjustment of the bolts 27 and their lock nuts 28.

The recesses 26 each have other coil springs 30 therein, together with adjusting means for varying the total yielding compression of the springs effective between the top and bottom plates. Said compression adjusting means herein include bolts 32, 32 each having an elongated head 33, a flange 34, and a shank 35 having threaded engagement with a collar 36. The head 33 of each bolt extends through a bore 37 in the top plate, and the flange 34 abuts a shoulder 38 counterbored from the under face of the top plate 11. The collar 36 is slidably mounted in the upper end of its recess 26 but is restrained from rotation therein by pins 38, 38 inset along opposite sides of said recess, as shown in Figure 4. A compression spring 30 is disposed in the bottom of each recess 26, in abutting engagement with the collar 36, so that the amount of compression thereof can be increased or decreased by rotation of the bolt 32 associated therewith.

I have found that with a limited cushioning or yielding movement provided by an arrangement such as above described, the cutting effectiveness of the tool carried by the holder is greatly improved in many ways. The tool cuts with much greater smoothness and less heating and tool wear than heretofore. The work can also be cut to greater accuracy, with fewer changes in adjustment of the tool itself, since the compression of the springs may be sufficient to automatically feed the tool to the final dimensions, thus avoiding excessive stresses on the tool while it is cutting to such final dimensions.

In practice, I find that the amount of yielding movement desired is relatively small, usually being in the order of, say, 5/1000 of an inch or less for most purposes. Moreover, the desired amount of movement for best results may vary considerably for various kinds of metal, for varying hardnesses thereof, and for different cutting operations. Such variations, however, can readily be ascertained by the operator from experience and by experiment.

As a further feature of my device, it will be observed that the yielding or cushioning movement of the tool holder can be positively limited, or eliminated entirely, by adjustment of the screw 22 which may be directly engaged with the end of the hub 21 of the bottom plate 13, as shown in Figure 2.

Although I have shown and described one particular embodiment of my invention, it will be understood that I do not wish to be limited to the exact construction shown and described, but that various changes and modifications may be made without departing from the spirit and scope of my invention as defined in the appended claims.

I claim as my invention:

1. In a rotary tool holder, a rotary base member, a tool supporting member adapted to hold a tool for feeding in a direction extending axially of said tool holder, and yielding connecting means therebetween permitting limited relative axial movement of said members, said yielding connecting means being maintained under sufficient compression to feed a tool to the work through the distance of relative movement of said members.

2. In a rotary tool holder, a rotary base member, a tool supporting member adapted to hold a tool for feeding in a direction extending axially of said tool holder, and yielding compression means therebetween permitting relative axial movement of said members in the order of approximately 5/1000 or less.

3. In a rotary tool holder, a rotary base member, a tool supporting member adapted to hold a tool for feeding in a direction extending axially of said tool holder, yielding connecting means therebetween permitting limited relative axial movement of said members, and means for adjusting the compression of said connecting means without increasing the amount of relative axial movement between said members.

4. In a rotary tool holder, a rotary base member, a tool supporting member adapted to hold a tool for feeding in a direction extending axially of said tool holder, a plurality of springs interposed between said members and arranged in concentric relation about the axis of rotation of said tool holder, and a plurality of connecting devices maintaining said springs under compression and limiting the relative axial movement between said members.

5. In a rotary tool holder, a rotary base member, a tool supporting member, a plurality of springs interposed between said members, a plurality of connecting devices maintaining said springs under compression and limiting the relative axial movement between said members, a plurality of other springs interposed between said members, and means for adjusting the compression of said last named springs without affecting the relative movement of said members determined by said connecting devices.

6. In a rotary tool holder, a rotary base member, a tool supporting member, a plurality of springs interposed between said members, a plurality of connecting devices maintaining said springs under compression and limiting the relative movement between said members, and a single axially disposed screw carried by one of said members and adjustable for direct engagement with the other of said members to provide additional limitation of relative movement therebetween or entirely eliminate such relative movement at will.

7. In a rotary tool holder, a rotary base member and a tool supporting member telescopically mounted for axial movement relative to each other, a plurality of coil springs mounted between said members, a plurality of bolts connecting said members for limited axial movement with said springs maintained under compression, and means for adjusting the compression of said springs independently of said connecting bolts.

8. In a rotary tool holder, a rotary base member and a tool supporting member telescopically mounted for axial movement relative to each other, a plurality of coil springs mounted between said members, a plurality of bolts connecting said members for limited axial movement with said springs maintained under compression, and means for adjusting the compression of said springs independently of said connecting bolts, including collars non-rotatably mounted in one of said members and abutting the adjacent ends of their respective springs, and a bolt threaded in each of said collars and having a head projecting through the other of said members.

WILLIAM J. WEBERG.